(12) United States Patent
Hirose et al.

(10) Patent No.: US 6,648,296 B2
(45) Date of Patent: Nov. 18, 2003

(54) HAND-OPERATED VALVE WITH LOCKING MECHANISM

(75) Inventors: Katsunori Hirose, Kasugai (JP); Takashi Yajima, Kasugai (JP)

(73) Assignee: CKD Corporation, Komaki (JP)

( * ) Notice: Subject to any disclaimer, the term of this patent is extended or adjusted under 35 U.S.C. 154(b) by 41 days.

(21) Appl. No.: 10/114,243

(22) Filed: Apr. 3, 2002

(65) Prior Publication Data

US 2002/0166985 A1 Nov. 14, 2002

(30) Foreign Application Priority Data

Apr. 24, 2001 (JP) .................................. 2001-125415

(51) Int. Cl.[7] ............................................. F16K 35/06
(52) U.S. Cl. .......................................... 251/78; 251/77
(58) Field of Search ...................................... 251/77–83

(56) References Cited

U.S. PATENT DOCUMENTS

| 3,981,358 A | * | 9/1976 | Watkins et al. | ................ 251/79 |
| 4,356,996 A | * | 11/1982 | Linder et al. | .................. 251/82 |
| 5,007,614 A | * | 4/1991 | Lockwood, Jr. | ............. 251/83 |
| 5,249,775 A | * | 10/1993 | Tabatabai | ..................... 251/77 |
| 5,509,438 A | * | 4/1996 | Leonard et al. | ............... 251/82 |

FOREIGN PATENT DOCUMENTS

JP          A 2000-97368          4/2000

* cited by examiner

*Primary Examiner*—Paul J. Hirsch
(74) *Attorney, Agent, or Firm*—Oliff & Berridge, PLC

(57) ABSTRACT

A hand-operated valve with a locking mechanism is disclosed. This valve includes: a valve main body including a valve body, a valve seat, and a screw mechanism which is actuated to bring the valve body into contact/noncontact with the valve seat; a locking mechanism for preventing actuation of the screw mechanism during a time when the valve body is in contact with the valve seat to close the valve; an operating member connected to the valve main body, for actuating the screw mechanism for contact/noncontact operation of the valve body with respect to the valve seat to thereby close/open the valve; and a play providing mechanism interposed in a connection between the operating member and the valve main body, for preventing the actuation of the screw mechanism during a predetermined stage of operation of the operating member.

13 Claims, 9 Drawing Sheets

HAND-OPERATED VALVE WITH LOCKING MECHANISM

BACKGROUND OF THE INVENTION

1. Field of the Invention

The present invention relates to a hand-operated valve for controlling a flow rate of fluid through manual operation of a screw mechanism, and more particularly to a hand-operated valve with a locking mechanism which precludes actuation of a screw mechanism when the valve is in a closed state.

2. Description of Related Art

Heretofore, there has been known a hand-operated valve provided with a locking mechanism in addition of a screw mechanism. Such a valve is disclosed in, for example, Japanese Patent Unexamined Publication 2000-97368. As shown in FIG. 10, this valve includes a main body 103 internally provided with a valve seat and a lock member 101 having an inverse L-shape, fixed to the main body 103. The lock member 101 is provided with a pinch part 101a surrounding the lower periphery of a handle 102 connected with a valve body. A lock bolt 104 is fastened to contract the diameter of the pinch part 101a, thereby locking the handle 102 to the main body 103.

The above conventional hand-operated valve with the locking mechanism, however, has the following disadvantages. To lock or unlock the handle 102, a worker has to operate the lock bolt 104 while firmly holding the handle 102 by one hand against rotation. This is to prevent even a little rotation of the handle 102 when the lock bolt 104 is operated, for example, unfastened to unlock the handle 102. If the handle 102 is unintentionally rotated even a little at the unfastening of the bolt 104, the valve is allowed to open, resulting in a fluid leak. Thus the worker must operate the lock bolt 104 by one hand with the other hand holding the handle 102. This would reduce a workability.

The above hand-operated valve is often used in a process gas supplying apparatus in a semiconductor manufacturing system. A recent tendency for this process gas supplying apparatus is toward an integration in a small area. However, the conventional hand-operated valve needs insertion of a hexagon nut or the like in a lateral direction to mount the locking mechanism to the valve, which results in wasted space.

SUMMARY OF THE INVENTION

The present invention has been made in view of the above circumstances and has an object to overcome the above problems and to provide a hand-operated valve with a locking mechanism capable of eliminating a need for a worker to hold a handle in operating the locking mechanism, thereby improving workability, and furthermore capable of allowing mounting in a small area without a need to provide wasted space.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a hand-operated valve with a locking mechanism including: a valve main body including a valve body, a valve seat, and a screw mechanism which is actuated to bring the valve body into contact/noncontact with the valve seat; a locking mechanism for preventing actuation of the screw mechanism during a time when the valve body is in contact with the valve seat to close the valve; an operating member connected to the valve main body, for actuating the screw mechanism for contact/noncontact operation of the valve body with respect to the valve seat to thereby close/open the valve; and a play providing mechanism interposed in a connection between the operating member and the valve main body, for preventing the actuation of the screw mechanism during a predetermined stage of operation of the operating member.

In another aspect of the invention, a hand-operated valve with a locking mechanism includes: a valve main body including a valve body, a valve seat, and a screw mechanism which is actuated to bring the valve body into contact/noncontact with the valve seat; a padlock for preventing actuation of the screw mechanism during a time when the valve body is in contact with the valve seat to close the valve; an operating member connected to the valve main body, for actuating the screw mechanism for contact/noncontact operation of the valve body with respect to the valve seat to thereby close/open the valve; and a play providing mechanism interposed in a connection between the operating member and the valve main body, for preventing the actuation of the screw mechanism during a predetermined stage of operation of the operating member.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a hand-operated valve with a locking mechanism of the present invention will now be given referring to the accompanying drawings.

Figure 1:
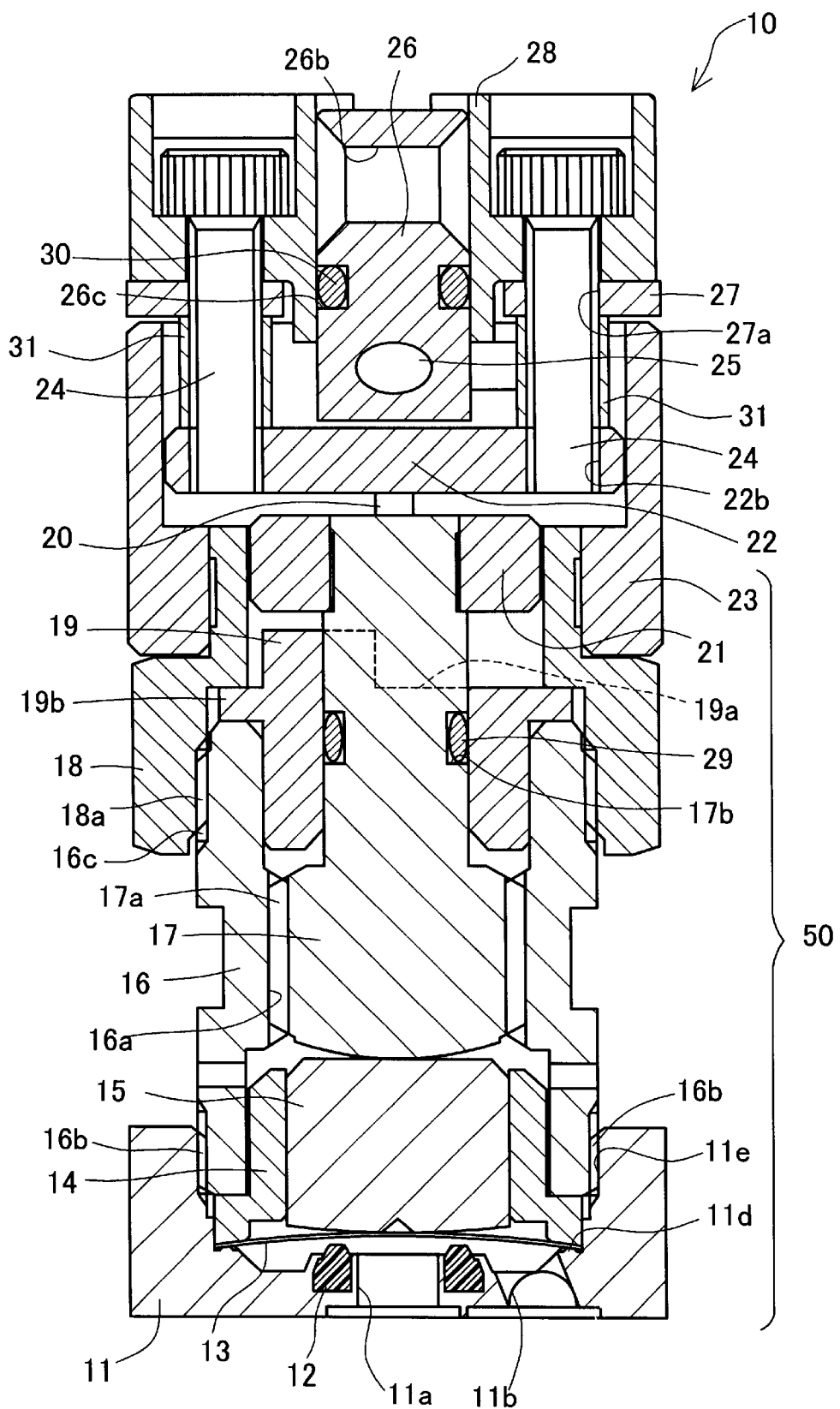
FIG. 1 is a longitudinal section view of a hand-operated valve with a locking mechanism in an embodiment according to the present invention and corresponds to a section view taken on line I—I in FIG. 3.
Figure 2:
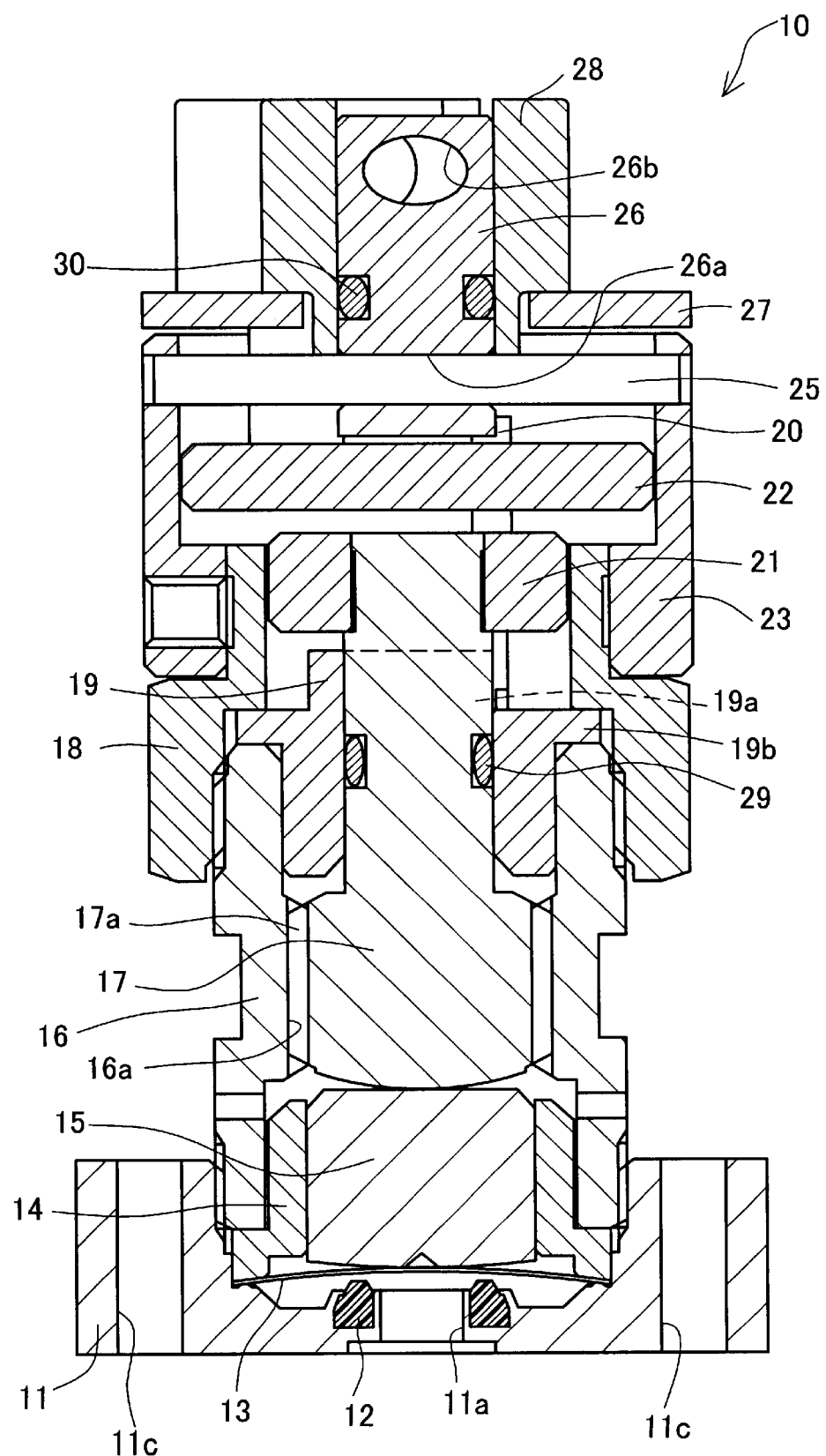
FIG. 2 is another longitudinal section view of the valve of FIG. 1 and corresponds to a section view taken on line II—II in FIG. 3.
Figure 3:
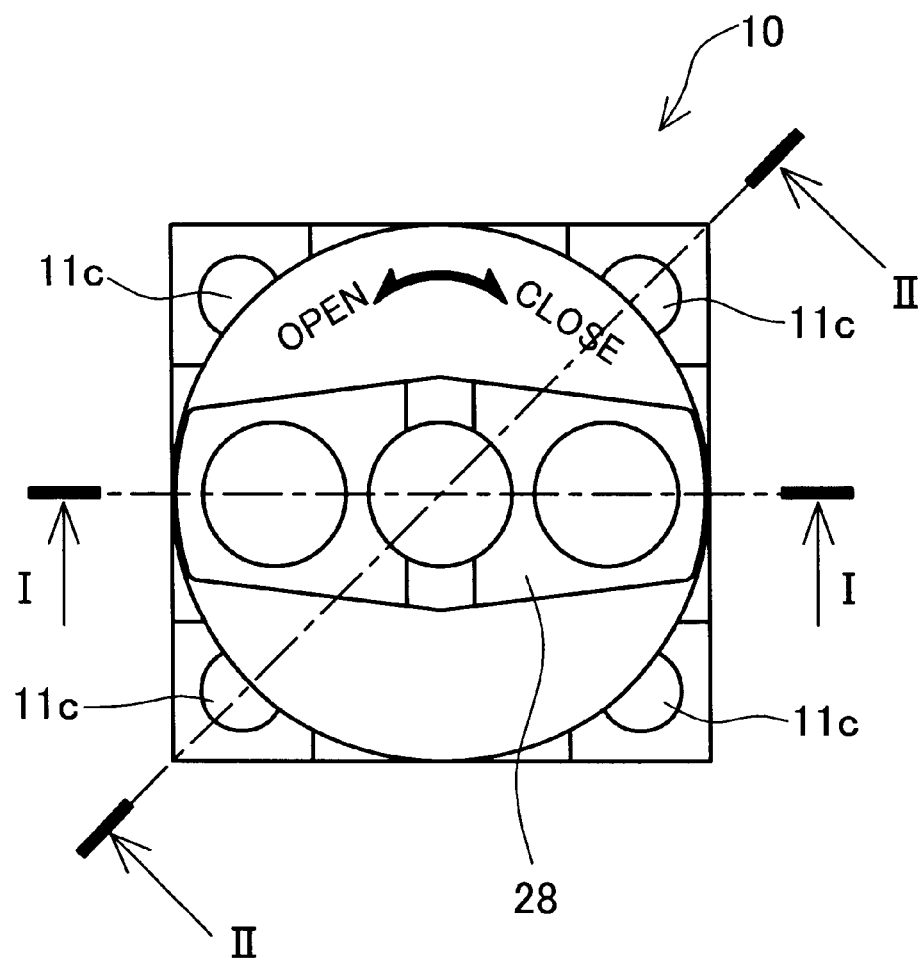
FIG. 3 is a plan view of the hand-operated valve in the embodiment.

FIG. 3 is a plan view of a hand-operated valve 10 with a locking mechanism in the present embodiment. FIG. 1 shows a section view of the valve 10, taken on line I—I in FIG. 3 and FIG. 2 shows another section view taken on line II—II in FIG. 3.

As shown in FIG. 1, the hand-operated valve 10 is provided with a main body 50 for controlling a flow rate of fluid therethrough. A base body 11 of this main body 50 is formed with a first valve port 11a opening at a center on the underside of the base body 11. A second valve port 11b is formed on the right (in FIG. 1) of the first port 11a. In the base body 11, a valve seat 12 made of resin or rubber is embedded surrounding the first port 11a with an upper surface protruding into a cavity of the base body 11. Release/contact between the valve seat 12 and a diaphragm 13 mentioned later allows/interrupts fluid communication between the first and second ports 11a and 11b, thereby opening/closing the valve 10.

Figure 8:
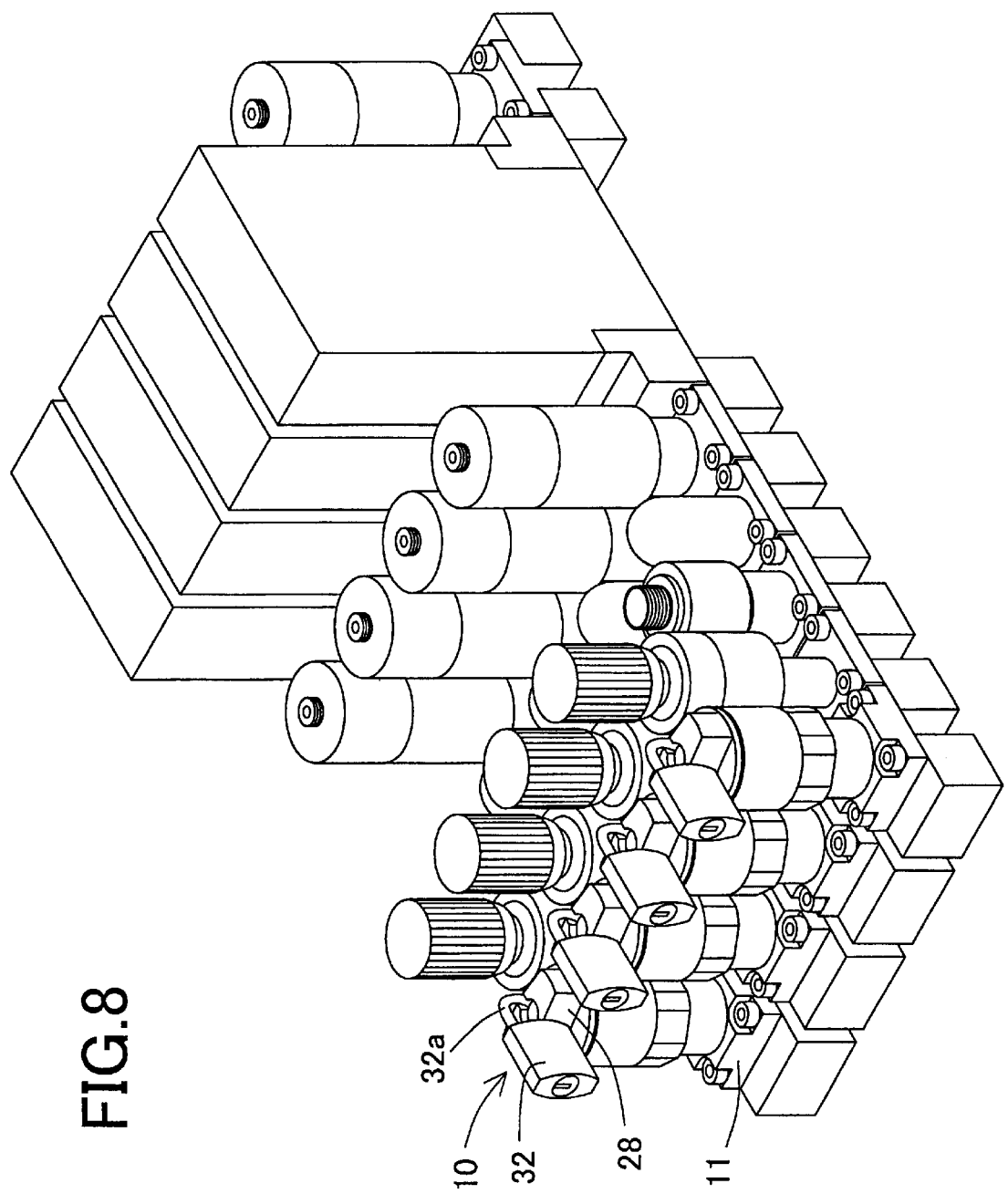
FIG. 8 is a perspective view of a process gas supplying apparatus on which the hand-operated valve shown in FIG. 3 is mounted.

The base body 11 is bolted through four mounting holes 11c shown in FIG. 3 onto a base of an apparatus for which the hand-operated valve 10 is used, for example, a process gas supplying apparatus shown in FIG. 8.

In the base body 11, the diaphragm 13 is arranged with its peripheral edge sandwiched between a stepped portion 11d formed in the cavity of the base body 11 and a lower end of a hollow cylindrical holder 14 so that a center portion of the diaphragm 13 is allowed to come into contact with or release from the valve seat 12. The holder 14 is fixedly disposed in the cavity of the base body 11 through a hollow cylindrical adapter 16. In other words, a first male thread 16b formed on the lower periphery of the adapter 16 is engaged with a female thread 11e formed on the upper inner periphery of the base body 11, so that a bottom of the adapter 16 presses the holder 14 against the base body 11. The holder 14 is thus fixed in the base body 11.

A stem 15 is slidably held in the hollow of the holder 14. This stem 15 is urged in a releasing direction from the valve seat 12 by a spring force of the diaphragm 13 in a state where no pressure is applied to the stem 15 from above. These diaphragm 13 and the stem 15 constitute a valve body in the present invention.

On an axially middle part of the inner periphery of the adapter 16, a female thread 16a is formed for engagement with a female thread 17a of a rod 17 mentioned later. In an upper part of the adapter 16, a hollow rod guide 19 is fitted with its radially extending supporting flange 19b made contact with a top of the adapter 16. Furthermore, a guide pressing cap 18 is disposed to cover the rod guide 19 and the upper part of the adapter 16. This guide pressing cap 18 with a female thread 18a is screwed on the adapter 16 with a second male thread 16c, thereby fixedly holding the rod guide 19 to the adapter 16. The rod guide 19 is formed at its upper end with a cutout 19a.

In the hollow of the rod guide 19, a rod 17 is inserted upward/downward slidably. The rod 17 is formed at its lower periphery with a female thread 17a which is engaged with the male thread 16a of the adapter 16. The rod 17 is further formed with a peripheral groove 17b on a slide surface with respect to the rod guide 19. In this groove 17b, an O-ring 29 is fitted.

Figure 4:
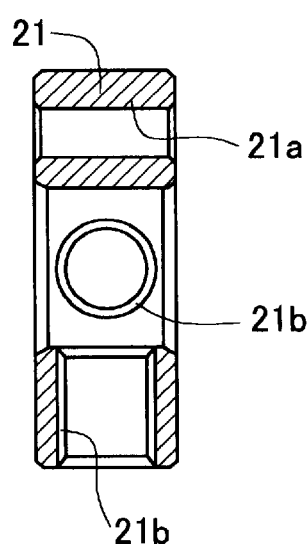
FIG. 4A is a section view of a rod ring used in the hand-operated valve of FIG. 1.
FIG. 4B is a plan view of the rod ring of FIG. 4A.
Figure 4:
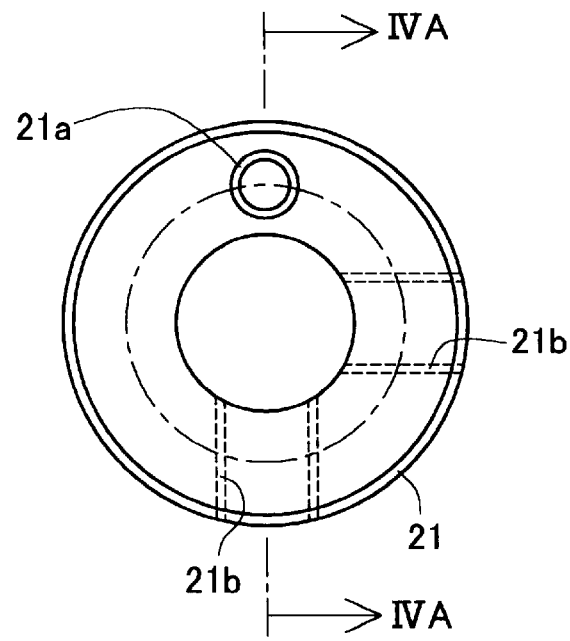

A rod ring 21 is fixed at an upper portion of the rod 17. This rod ring 21 is shown in FIGS. 4A (a plan view) and 4B (a section view). The rod ring 21 is fastened to the rod 17 with two screws not shown through two tapped holes 21b formed in a radial direction of the ring 21 as shown in FIG. 4B. The rod ring 21 is further formed with an axial through hole 21a as shown in FIG. 4A taken along line IVA—IVA in FIG. 4B, in which a lower portion of a drive transmission pin 20 is press-fitted.

Figure 6:
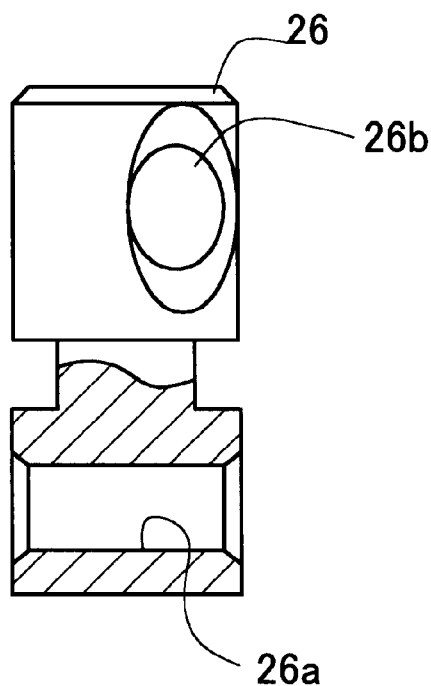
FIG. 6A is a section view of a subrod used in the hand-operated valve of FIG. 1, seen from the same direction as that for FIG. 2.
FIG. 6B is another section view of the subrod of FIG. 6A, seen from the same direction as that for FIG. 1.
Figure 6:
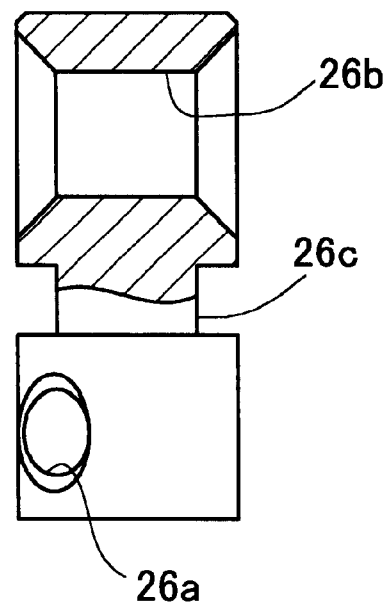

A hollow cylindrical housing 23 is screwed on an upper periphery of the guide pressing cap 18. In the housing 23, as shown in FIG. 2, a connecting pin 25 is arranged diametrically extending with its both ends fixed in the housing 23. A subrod (fixed rod) 26 is fixedly disposed at a center portion of the connecting pin 25. This subrod 26 is shown in FIGS. 6A and 6B. FIG. 6A is a section view of the subrod 26 seen from the same direction as that for FIG. 2. FIG. 6B is another section view of the subrod 26 seen from the same direction as that for FIG. 1. The subrod 26 is formed with a lower through hole, or a connecting hole 26a in which the connecting pin 25 is inserted, and an upper through hole, or a lock hole 26b.

A handle 28 is rotatably arranged surrounding the upper periphery of the subrod 26. This handle 28 constitutes an operating member in the present invention. The subrod 26 is further formed with a peripheral groove 26c, in which an O-ring 30 is fitted.

Figure 7:
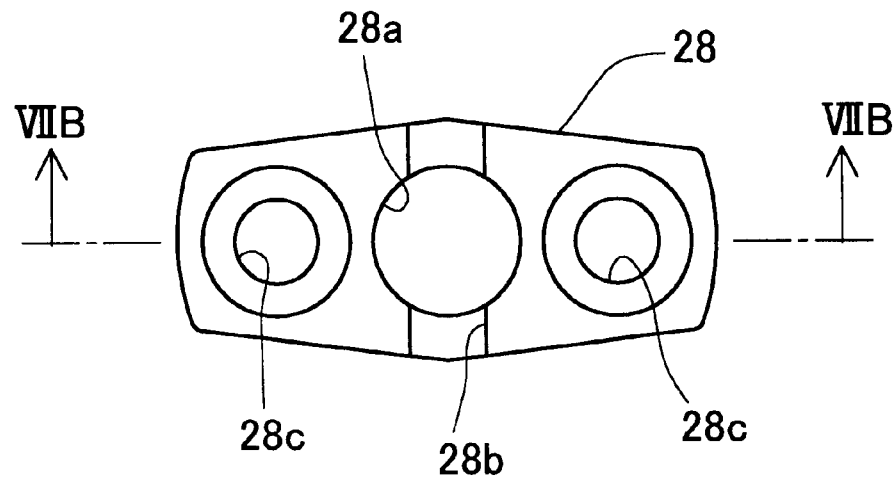
FIG. 7A is a plan view of a handle used in the hand-operated valve of FIG. 1.
FIG. 7B is a side section view of the handle of FIG. 7A.
Figure 7:
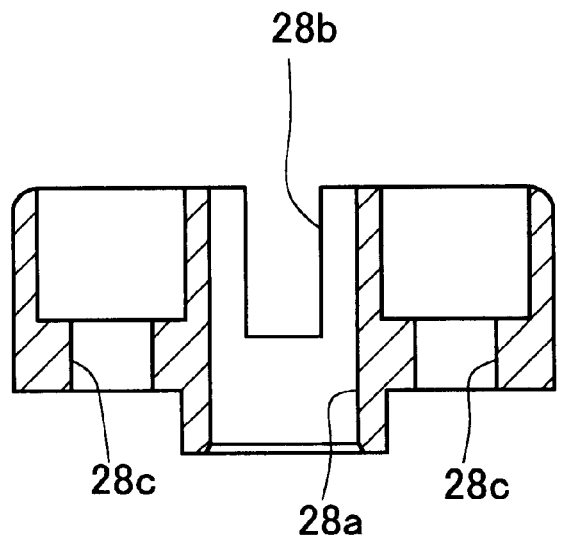

The handle 28 is shown in FIGS. 7A and 7B. FIG. 7A is a plan view of the handle 28 and FIG. 7B is a section view taken on line VIIB—VIIB in FIG. 7A. The handle 28 is formed at its center with a center through hole 28a extending in a vertical direction in FIG. 7B. This center hole 28a is engaged with an upper portion of the subrod 26. A cover 27 is disposed between the handle 28 and an upper end of the housing 23 as shown in FIG. 1.

The handle 28 is further formed with two lock slots 28b disposed at diametrically opposed positions with respect to the center hole 28a as shown in FIG. 7A, providing diametrical communication between the center hole 28a and the outside of the handle 28. Each lock slot 28b also opens at an upper surface of the handle 28 and has a longitudinal length enough to communicate with the lock hole 26b of the subrod 26 in the valve closed state. On both sides (right and left in FIGS. 7A and 7B) of the center hole 28a, a pair of stepped holes 28c for bolts 24 are formed. The cover 27 is correspondingly formed with a pair of through holes 27a each having substantially the same diameter as that of the stepped hole 28c. Under the cover 27, a pair of collars 31 are disposed in correspondence with the holes 27a respectively.

Figure 5:
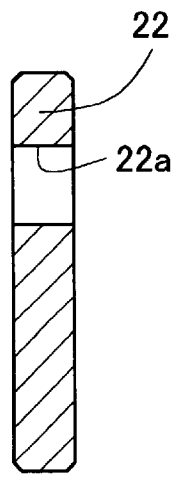
FIG. 5A is a side section view of a dummy handle used in the hand-operated valve of FIG. 1.
FIG. 5B is a plan view of the dummy handle of FIG. 5A.
Figure 5:
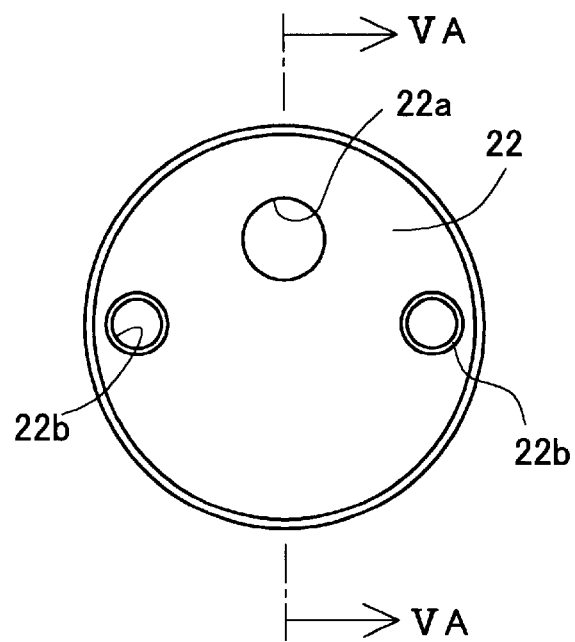

The handle 28 is connected to the dummy handle 22 with a pair of bolts 24 through the stepped holes 28c, the cover 27, and the collar 31. The dummy handle 22 is shown in FIGS. 5A and 5B. FIG. 5B is a plan view of the dummy handle 22 and FIG. 5A is a section view thereof taken on line VA—VA in FIG. 5A.

To be more specific, the dummy handle 22 has an approximate disc shape and a pair of female-threaded holes 22b disposed near both diametrical ends (in FIG. 5B) and at the positions corresponding to the stepped holes 28c. The bolts 24 are screwed into these female threads 22b to fix the handle 28 to the dummy handle 22. The dummy handle 22 is further formed with a through hole, or a transmission hole 22a, disposed at an off-center position.

The drive transmission pin 20 is press-fitted at its lower end in the hole 21a of the rod ring 21 and inserted with play at its upper end in the transmission hole 22a of the dummy handle 22. In the present embodiment, for example, the diameter of the transmission hole 22a is designed to be 5 mm and that of the drive transmission pin 20 is designed to be 2 mm, providing the play of 3 mm between the hole 22a and the pin 20. The transmission hole 22a of the dummy handle 22 and the transmission pin 20 constitute a play providing mechanism in the present invention, interposed in a connection between the handle 28 and the main body 50.

Next, explanation will be made on the operation of the hand-operated valve 10 with the locking mechanism having the above construction.

The following explanation exemplifies a case where the hand-operated valve 10 is used in a process gas supplying apparatus in a semiconductor manufacturing system. In this process gas supplying apparatus, various valves and a flow meter in addition of the hand-operated valve 10 are integrally mounted in a small area.

In this case, a needed opening of the valve (namely, a gap to be produced between the valve seat 12 and the diaphragm 13) is normally small. Accordingly, the turning amount (angle) of the handle 28 needed to open the valve is 90 degrees or less. This valve opening/closing work is usually carried out by a worker with his hands, which raises a possibility where the worker may operate the handle 28 erroneously or unintentionally in a closed state of the valve 10. To prevent such an erroneous or unintentional operation, the hand-operated valve with the locking mechanism according to the present invention is arranged such that the handle 28 is locked by the locking mechanism and the play providing mechanism during the time the valve is in a closed state, thereby preventing the opening of the valve.

At first, the case of closing the valve 10 in an opened state by the worker is explained.

When the worker turns the handle 28 clockwise around the subrod 26, the dummy handle 22 connected thereto is simultaneously rotated clockwise. At this time, the upper portion of the drive transmission pin 20 inserted in the transmission hole 22a of the dummy handle 22 is still in noncontact at a rear side of the pin 20 in a clockwise direction with the inner wall defining the transmission hole 22a because of the play provided between the pin 20 and the hole 22a as mentioned above. Accordingly, in the early stage of the turning of the handle 28, for example, in an angle range of 30 to 35 degrees from the turning start position in the present embodiment, the rotating force of the dummy handle 22 when rotated is not transmitted to the rod ring 21 through the pin 20. Thus the rod ring 21 is not rotated at this time.

When the worker further turns the handle 28 clockwise, the inner wall defining the transmission hole 22a of the dummy handle 22 comes into contact with the pin 20 on the rear side in the clockwise direction, causing the rod ring 21 to rotate clockwise. Rotation of this rod ring 21 fixed to the rod 17 as mentioned above produces a corresponding clockwise rotation of the rod 17. Upon the rotation of the rod 17, the resulting screw actuation by the male thread 17a of the rod 17 and the female thread 16a of the adapter 16 causes the rod 17 to move down.

As moved down, the rod 17 presses the stem 15 down against the upward urging force of the diaphragm 13. The down-moved stem 15 presses the diaphragm 13, which is brought into contact with the valve seat 12.

Figure 9:
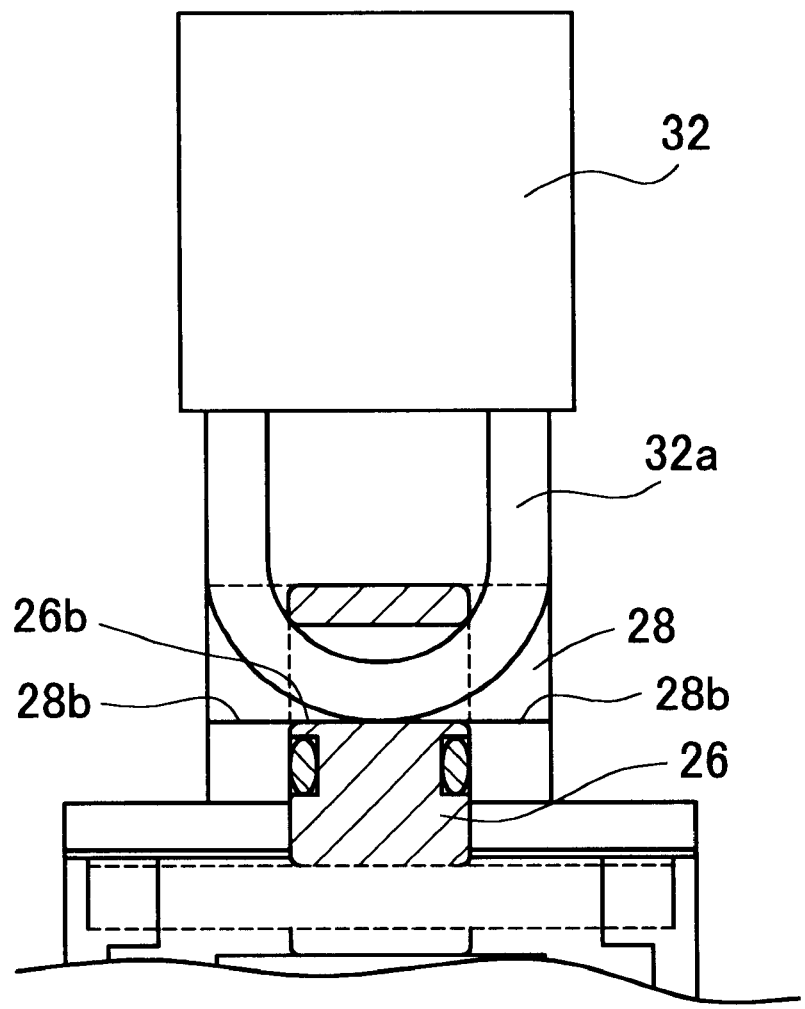
FIG. 9 is a partial view showing the hand-operated valve shown in FIG. 3 to which a padlock is attached.
Figure 10:
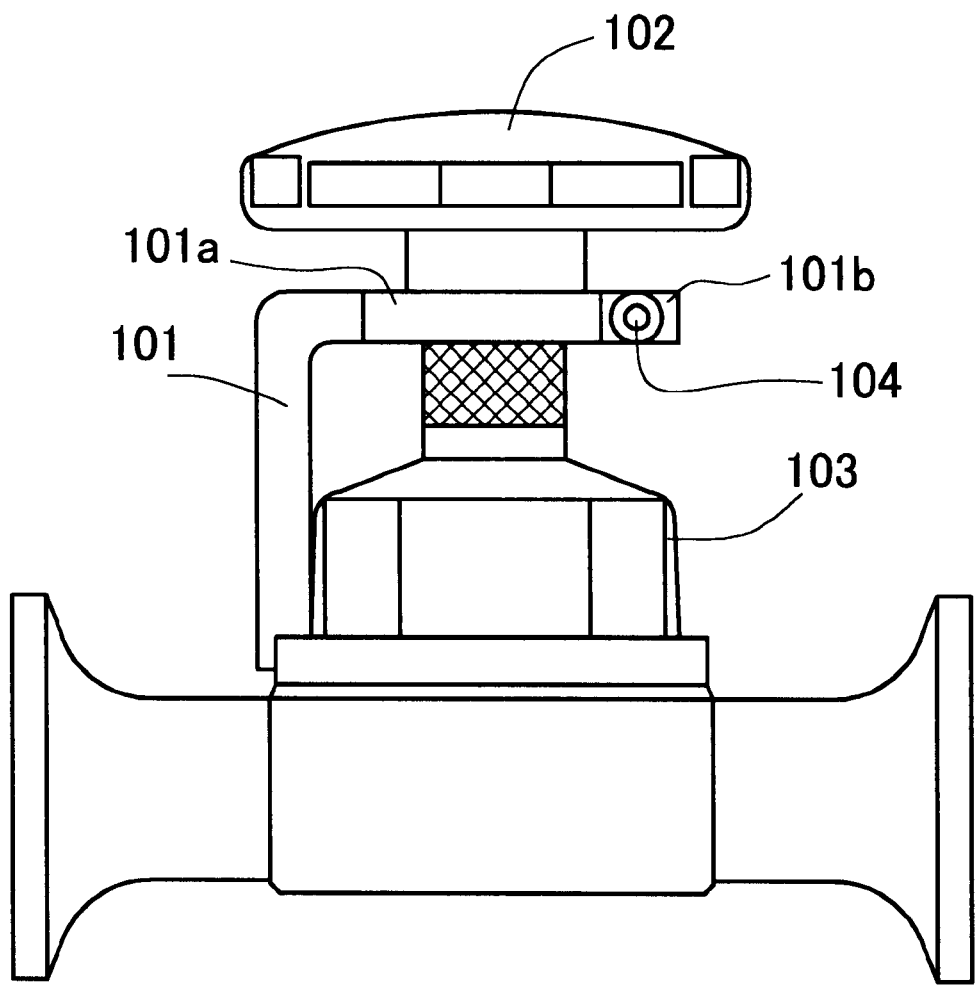
FIG. 10 is a view of a hand-operated valve with a lock mechanism in a prior art.

The valve 10 (the valve port 11a) is closed in the above manner. In this valve closed state, the lock slots 28b of the handle 28 are aligned in line with the lock hole 26b of the subrod 26 as shown in FIG. 9. Thus the lock hole 26b is in open communication into the outside through the lock slots 28b.

In order to firmly prevent an erroneous operation of the handle 28 in the valve closed state, a padlock 32 is attached to the handle 28. The lock hole 26b of the subrod 26 and the lock slots 28b of the handle 28 are in alignment relation at this time, so that a shackle 32a of the padlock 32 can be continuously, smoothly inserted into the lock slots 28b and the lock hole 26b. In addition, even if a slight turning of the handle 28 in an opening direction (a counterclockwise direction) is caused by the attachment work of the padlock 32, the rod ring 21 (i.e. the rod 17) is not rotated by the play between the pin 20 and the transmission hole 22a. This makes it possible to prevent the screw actuation between the rod 17 and the adapter 16, thus precluding the unintentional opening of the valve 10.

Furthermore, the lock slots 28b in the hand-operated valves 10 adjacently arranged as shown in FIG. 8 are positioned in parallel with one another. Accordingly, the attaching operation of the padlock 32 to each valve 10 will not be obstructed by adjacent valves 10.

With the padlock 32 attached in the above manner, the handle 28 can firmly be locked with respect to the subrod 26 fixed in the main body 50.

Consequently, the turning of the handle 28 is not permitted unless the padlock 32 is removed. This can prevent the valve opening except when the worker needs. Please note that the padlock 32, the lock hole 26b, and the lock slots 28b constitute a locking mechanism in the present invention.

Next, the case of opening the valve 10 by the worker is explained. The worker unlocks and removes the padlock 32 from the valve 10. At this time, the lock hole 26b of the subrod 26 and the lock slots 28b of the handle 28 are still aligned in line. The shackle 32a of the padlock 32 can therefore be smoothly pulled out. The lock slots 28 in the adjacent hand-operated valves 10 are also positioned in parallel with each other, so that removal of the padlock 32 from each valve 10 will not be obstructed by adjacent valves 10.

It is to be noted that, at the detachment of the padlock 32, the worker may unintentionally touch the handle 28, resulting in a little turn thereof. At that time, however, the drive transmission pin 20 is in noncontact at a rear side thereof in a counterclockwise direction with the inner wall defining the transmission hole 22a of the dummy handle 22. Therefore, a slight rotation of the dummy handle 22 in synchronization with the turning of the handle 28 does not cause the rod ring 21 to rotate, so that the valve 10 will not be opened at all.

After the detachment of the padlock 32, the worker turns the handle 28 counterclockwise around the subrod 26 at the time the valve has to be opened. The counterclockwise turning of the handle 28 causes the dummy handle 22 thereto connected to rotate counterclockwise. In the early stage of the turning of the handle 28, the inner wall forming the transmission hole 22a of the dummy handle 22 is in noncontact with the transmission pin 20 on the rear side in the counterclockwise direction because of the play provided between the pin 20 and the hole 22a. Thus the rotation of the dummy handle 22 is not transmitted to the rod ring 21 in an angle range of for example 30 to 35 degrees from the turning start position of the handle 28 (and the dummy handle 22).

When the worker further turns the handle 28 counterclockwise, the inner wall forming the transmission hole 22a comes into contact with the pin 20 on the rear side in the counterclockwise direction, causing the rod ring 21 to rotate counterclockwise. Rotation of this rod ring 21 fixed to the rod 17 produces a corresponding counterclockwise rotation of the rod 17. Upon the rotation of the rod 17, the resulting screw actuation by the male thread 17a of the rod 17 and the female thread 16a of the adapter 16 causes the rod 17 to move up.

As the rod 17 is moved up, the stem 15 is released from the downward pressure of the rod 17 and pushed up by the urging force of the diaphragm 13, which is released from the contact with the valve seat 12, thereby opening the valve port 11a. Thus the valve is in an opened state.

As explained above, the hand-operated valve 10 with the locking mechanism in the present embodiment includes the screw mechanism 16a and 17a for bringing the diaphragm 13 into contact or noncontact with the valve seat 12 and the locking mechanism 32, 28b, and 26b for preventing the actuation of the screw mechanism 16a and 17a in the valve closed state where the diaphragm 13 is in contact with the valve seat 12. The valve 10 further includes the handle 28 for motion of the diaphragm 13 through the screw mechanism 16a and 17a, the drive transmission pin 20 and the transmission hole 22a of the dummy handle 22 which constitute the play providing mechanism that is not acted upon by the screw mechanism 16a and 17a in a predetermined angle range of turning of the handle 28. With this structure, through the action between the transmission pin 20 and the transmission hole 22a, the screw mechanism 16a and 17a are prevented from being actuated even when the locking mechanism 28b and 26b (i.e. the handle 28) is operated erroneously or unintentionally at attachment/detachment of the padlock 32. Thus, even if the worker operates the locking mechanism (i.e. the padlock 32) without holding the handle 28 by one hand, the opening/closing of the valve is not affected at all.

The play of the play providing mechanism is designed to be larger than a clearance among the constituents 32, 28b, and 26b of the locking mechanism. Even if the handle 28 is operated (turned) by the clearance, therefore, the actuation of the screw mechanism 16a and 17a is prevented owing to the action between the transmission pin 20 and the transmission hole 22a of the dummy handle 22. Erroneous operation of the handle 28 at attachment of the padlock 32 will have no effect on the opening/closing of the valve.

Moreover, the hand-operated valve 10 includes the turning handle 28 with the center hole 28a and the subrod 26 which is inserted in the center hole 28a and fixed to the main body 50 side. To maintain the valve 10 in the closed state, the handle 28 is fixedly held with respect to the subrod 26 by the locking mechanism. With this arrangement, namely, the locking of the handle 28 to the subrod 26 inserted therein, even if the valve 10 is mounted in a small area such as the process gas supplying apparatus in the semiconductor manufacturing system, the padlock 32 can easily be attached or detached to the handle 28 and the subrod 26 without obstruction by adjacent valves. This can improve the valve locking/unlocking workability.

Since the padlock 32 is placed within a planar occupation space of the main body 50, namely, the base body 11, the hand-operated valve 10 can be arranged closer to other valves or the like, thus increasing space-efficiency.

The present invention may be embodied in other specific forms without departing from the spirit or essential characteristics thereof. For instance, although the subrod 26 is formed with the hole 26b and the handle 28 is formed with the slots 28b in the above embodiment, they may be reversed. Specifically, the subrod 26 is formed with a slot and the handle 28 is formed with holes.

The padlock 32 in the above embodiment may be commercially available one. Alternatively, a special locking mechanism may be produced according to the size and shape of the hand-operated valve 10.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A hand-operated valve with a locking mechanism including:
    a valve main body including:
        a valve body;
        a valve seat; and
        a screw mechanism which is actuated to bring the valve body into contact/noncontact with the valve seat;
    a locking mechanism for preventing actuation of the screw mechanism during a time when the valve body is in contact with the valve seat to close the valve;
    an operating member connected to the valve main body, for actuating the screw mechanism for contact/noncontact operation of the valve body with respect to the valve seat to thereby close/open the valve; and
    a play providing mechanism interposed in a connection between the operating member and the valve main body, for preventing the actuation of the screw mechanism during a predetermined stage of operation of the operating member.

2. The hand-operated valve with the locking mechanism according to claim 1, wherein the play providing mechanism has play designed to be larger than clearance in the locking mechanism.

3. The hand-operated valve with the locking mechanism according to claim 2, wherein the operating member is a turning handle, and the play providing mechanism includes:
    a dummy handle rotatable in synchronization with turning of the handle, the dummy handle being provided with a transmission hole disposed at an off-center position; and
    a transmission pin having a smaller diameter than that of the transmission hole of the dummy handle, the pin being fixed at one end in the valve main body and movably inserted at the other end in the transmission hole of the dummy handle.

4. The hand-operated valve with the locking mechanism according to claim 3, wherein a diameter of the transmission hole of the dummy handle is designed to be larger than a diameter of the transmission pin so that a driving force of the dummy handle is prevented from being transmitted to the transmission pin in an angle range of 30 to 35 degrees from a start position of turning of the handle.

5. The hand-operated valve with the locking mechanism according to claim 3, wherein the diameter of the transmission pin is 2 mm and that of the transmission hole of the dummy handle is 5 mm.

6. The hand-operated valve with the locking mechanism according to claim 2, wherein the operating member is a turning handle with a center hole,
    the hand-operated valve further includes a fixed rod inserted at one end portion in the center hole of the handle and secured at the other end portion to the valve main body, and the locking mechanism locks the handle to the fixed rod.

7. The hand-operated valve with the locking mechanism according to claim 6, wherein the fixed rod is formed with a lock hole in the end portion inserted in the center hole of the handle, the handle is formed with a lock slot providing communication between the center hole and an outside, and the lock hole and the lock slot are aligned in line when the valve is in a closed state where the valve body is in contact with the valve seat.

8. A hand-operated valve with a locking mechanism including:

a valve main body including:
a valve body;
a valve seat; and
a screw mechanism which is actuated to bring the valve body into contact/noncontact with the valve seat;

a padlock for preventing actuation of the screw mechanism during a time when the valve body is in contact with the valve seat to close the valve;

an operating member connected to the valve main body, for actuating the screw mechanism for contact/noncontact operation of the valve body with respect to the valve seat to thereby close/open the valve; and a play providing mechanism interposed in a connection between the operating member and the valve main body, for preventing the actuation of the screw mechanism during a predetermined stage of operation of the operating member.

9. The hand-operated valve with the locking mechanism according to claim 8, wherein the padlock is positioned within a planar occupation space of the main valve body.

10. The hand-operated valve with the locking mechanism according to claim 8, wherein the operating member is a turning handle with a center hole, the hand-operated valve further includes a fixed rod inserted at one end portion in the center hole of the handle and fixed at the other end portion to the valve main body, and the padlock locks the handle to the fixed rod.

11. The hand-operated valve with the locking mechanism according to claim 10, wherein the play providing mechanism has play designed to be larger than clearance produced between the handle and the fixed rod when they are locked by the padlock.

12. The hand-operated valve with the locking mechanism according to claim 11, wherein the operating member is a turning handle, the play providing mechanism includes:
a dummy handle rotatable in synchronization with turning of the handle, the dummy handle being provided with a transmission hole disposed at an off-center position; and a transmission pin having a smaller diameter than that of the transmission hole of the dummy handle, the pin being fixed at one end in the valve main body and movably inserted at the other end in the transmission hole of the dummy handle, and a diameter of the transmission hole of the dummy handle is designed to be larger than a diameter of the transmission pin so that a driving force of the dummy handle is prevented from being transmitted to the transmission pin at attachment/detachment of the padlock.

13. The hand-operated valve with the locking mechanism according to claim 10, wherein the fixed rod is formed with a lock hole in the end portion inserted in the center hole, the handle is formed with a lock slot providing communication between the center hole and an outside, and the lock hole and the lock slot are aligned in line when the valve is in a closed state where the valve body is in contact with the valve seat.

* * * * *